July 15, 1952 G. P. McCOUCH 2,603,745

PANORAMIC RECEIVING SYSTEM

Filed Jan. 3, 1946

INVENTOR
GORDON P. McCOUCH
BY
William D. Hall
ATTORNEY

Patented July 15, 1952

2,603,745

UNITED STATES PATENT OFFICE 2,603,745

PANORAMIC RECEIVING SYSTEM

Gordon P. McCouch, Cambridge, Mass., assignor to the United States of America as represented by the Secretary of War Application January 3, 1946, Serial No. 638,900

3 Claims. (Cl. 250—20)

This invention relates to electrical apparatus and more particularly to panoramic receiving systems.

Panoramic receivers provide a visual display on a cathode ray tube of the signals present in a band of frequencies. Usually the signals appear as vertical pips on a horizontal base line which is laid out in frequency units.

In a former method of panoramic presentation, the so-called "panoramic adapter" has been used. The panoramic adapter is coupled into a standard superheterodyne receiver at a point between the mixer stage and the intermediate frequency amplifier of the standard receiver. The panoramic adapter itself includes a broad band amplifier having a double hump frequency response characteristic, a panoramic mixer having a frequency modulated local oscillator associated therewith, a narrow band intermediate frequency amplifier, a detector, an amplifier and a cathode ray tube. One set of plates of the cathode ray tube is connected to the output of the amplifier and the other set of plates is connected to a voltage which is a function of the instantaneous frequency of the frequency modulated local oscillator. Hence a panoramic presentation of the signals present in the mixer output of the standard receiver is displayed on the cathode ray tube. The double hump frequency response characteristic of the broad band amplifier in the panoramic adapter is intended to compensate for the sloping sides of the frequency response characteristic at the standard receiver mixer output. The resultant should be a fairly uniform frequency response characteristic (though limited frequency band) at the output of the broad band amplifier of the panoramic adapter.

There are several disadvantages in using the panoramic adapter. Inherently the panoramic presentation is confined to a fairly limited band of frequencies. In addition, tuning the standard receiver will alter the panoramic display, which is confusing and particularly undesirable where it is necessary to keep track of a number of different signals.

An object of the present invention is to provide a panoramic receiving system including a panoramic receiver adapted to furnish a panoramic presentation on a cathode ray tube of the signals in a band of frequencies and a separate auxiliary receiver which may be tuned to any frequency within said band of frequencies.

A further object of the present invention is to provide an indication on said cathode ray tube of the frequency to which said auxiliary receiver is tuned.

A still further object of the invention is to provide said indication without the use of additional circuits.

Other objects and advantages of the invention will be apparent during the course of the following description.

The invention utilizes a panoramic superheterodyne receiver and a separate auxiliary superheterodyne receiver. The intermediate frequencies and the local oscillator frequencies of the two receivers are chosen so that, for both receivers tuned to the same signal frequency, the local oscillator frequency of the auxiliary receiver is identical with the signal image frequency for the panoramic receiver. Therefore radiation from the auxiliary receiver local oscillator is picked up by the panoramic receiver just as any other signal would be. The relations necessary to accomplish this are:

1. Both local oscillators should be either above or below the signal band of frequencies.

2. The intermediate frequency of the auxiliary receiver should be twice the intermediate frequency of the panoramic receiver.

A further relation, not peculiar to the present invention, is that the intermediate frequency of the panoramic receiver be greater than one-half the width of the signal band of frequencies which the panoramic receiver covers. This is necessary in order to avoid ambiguity between signals in the upper and lower halves of said band of frequencies.

Other objects, features and advantages of this invention will suggest themselves to those skilled in the art and will become apparent from the following description of the invention taken in connection with the accompanying drawings in which.

Figure 1:
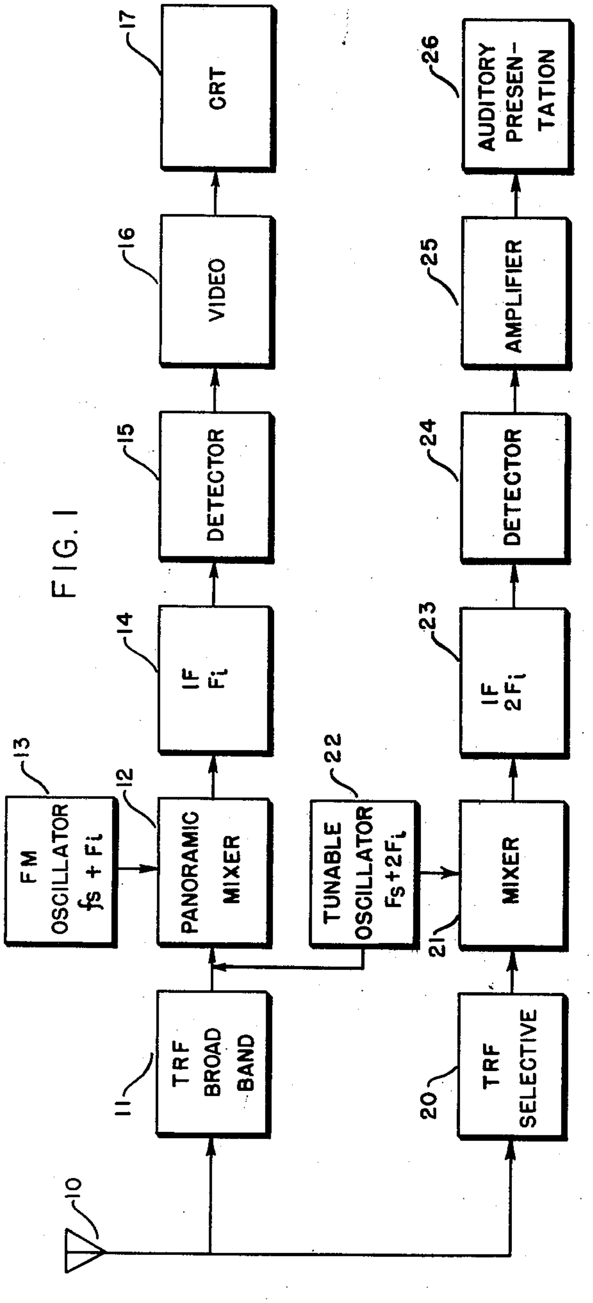
Fig. 1 is a block diagram of a panoramic receiving system which illustrates one possible embodiment of the invention.

In Fig. 1, numeral 10 designates an antenna adapted to furnish radio frequency signals to a panoramic receiver and to a separate auxiliary listen-through receiver. Both receivers are of the superheterodyne type.

The panoramic receiver includes a broad band tuned radio frequency amplifier circuit 11 which is adapted to pass the signal band of frequencies under investigation to a panoramic mixer or frequency conversion circuit 12.

Associated with panoramic mixer 12 is a frequency modulated local oscillator 13. The frequency modulated oscillator 13 furnishes a frequency modulated output having an instantaneous frequency $(f_s+F_i)$, where $F_i$ is some intermediate frequency and $f_s$ varies continuously between the limits of the signal band of frequencies.

While frequency modulated oscillator 13 is here shown as operating at frequencies above the signal band of frequencies, it is to be understood that frequency modulated oscillator 13 may operate as well as frequencies below the signal band of frequencies, this choice being one of design.

An intermediate frequency amplifier 14 tuned to a frequency of $F_i$ is electrically connected to the output of the panoramic mixer 12. A detector 15 and amplifier 16 follow the intermediate frequency amplifier 14 in the customary manner. One set of plates of a cathode ray tube 17 is electrically connected to the output of amplifier 16. The other set of plates of the cathode ray tube 17 is electrically connected to a voltage which is a function of the instantaneous frequency of the frequency modulated oscillator 13 (this latter connection not shown).

The separate auxiliary listen-through receiver which operates in the same frequency range as the panoramic receiver includes a selective tuned radio frequency amplifier circuit 20 adapted to pass a comparatively narrow band of frequencies as compared with the signal band of frequencies at the input to panoramic mixer 12. A mixer or frequency conversion circuit 21 is electrically connected to the output of the selective tuned radio frequency circuit 20. Associated with mixer 21 is a tunable local oscillator 22 having a signal frequency of $F_s+2F_i$, where $F_s$ is the frequency to which the auxiliary receiver is tuned.

If, however, the frequency of frequency modulated oscillator 13 is $(f_s-F_i)$, then the frequency of oscillator 22 should be $F_s-2F_i$.

An intermediate frequency amplifier 23 tuned to a frequency of $2F_i$, followed by a detector 24 and amplifier 25, is electrically connected to the output of mixer 21. Various presentation means 26 may be connected to the output of amplifier 25. Thus presentation means 26, while indicated as auditory presentation in Fig. 1, might be an oscilloscope, frequency meter or other device for studying the frequency under consideration.

The tunable local oscillator 22 is electrically coupled to the input of panoramic mixer 12. This may be a direct coupling, or if the shielding is poor, stray coupling may be sufficient.

Figure 2:
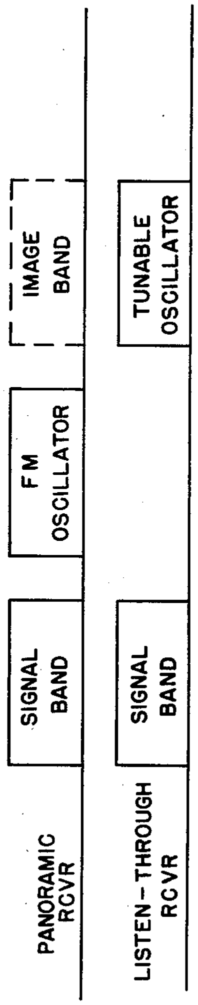
Fig. 2 shows one possible arrangement of the various frequency bands relevant to the operation of the panoramic receiving system of Fig. 1 and is drawn to simplify the explanation of the invention.

The following description, taken with reference to Figs. 1 and 2, will clarify the operation of the panoramic receiving system shown in Fig. 1. It will be assumed that both local oscillators are operated at frequencies above the signal band of frequencies, but it should be understood that the invention is equally applicable where both local oscillators are operated below the signal band of frequencies. The frequency bands indicated on Fig. 2 are purely exemplary and are intended to simplify the explanation of the invention.

The output of the broad band tuned radio frequency amplifier circuit 11 will be the signal band of frequencies under study by the panoramic receiving system, and is indicated as the signal band (Fig. 2). Let us suppose, for example, that this signal band extends from 45 to 50 megacycles and let us suppose that the intermediate frequency $F_i$ is 6 megacycles. Then, since $f_s$ varies from 45 to 50 megacycles, the frequency of the frequency modulated oscillator 13 $(f_s+F_i)$ will vary from 51 to 56 megacycles. By connecting one set of plates of cathode ray tube 17 to the output of amplifier 16 and the other set of plates to a voltage which is a function of the instantaneous frequency of frequency modulated oscillator 13, a panoramic presentation of signals in the signal band 45 to 50 megacycles will be displayed on the cathode ray tube 17. The auxiliary listen-through receiver would, in this example, be tunable to any frequency in the 45 to 50 megacycle band. The intermediate frequency amplifier 23 of the auxiliary listen-through receiver is tuned to a frequency of $2F_i$, which in the present case would be 12 megacycles. Hence, the tunable oscillator 22 would be tunable over the range of 57 to 62 megacycles. However, the range of the tunable oscillator 22 then coincides with the image frequency band for the panoramic mixer 12 and by coupling the output of tunable oscillator 22 to the input of panoramic mixer 12, an indication on the cathode ray tube 17 will be obtained corresponding to the frequency to which the auxiliary listen-through receiver is tuned.

The indication will, of course, be similar to that of any other signal. Identification of the indicating marker may be accomplished by any one of several methods. For example, the listen-through receiver may be detuned momentarily or the coupling between oscillator 22 and mixer 12 may be momentarily disconnected.

This panoromic receiving system has several important advantages.

(1) A detailed study of any signal or signals selected from the panoramically presented band of frequencies may be made without interfering with the panoramic presentation during the listening period.

(2) Rapid setting of the auxiliary receiver to new frequencies or the following of signals shifting in frequency is possible.

(3) Accurate alignment of the tuning of the auxiliary receiver with that of the signal under investigation is possible.

(4) No additional circuits other than the two receivers are required.

It will be apparent that there may be deviations from the invention as described which still fall fairly within the spirit and scope of the invention.

Accordingly I claim all such deviations which fall fairly within the spirit and scope of the invention as identified in the hereinafter appended claims.

What is claimed is:

1. A panoramic receiving system for a band of frequencies including a panoramic superheterodyne receiver for said band of frequencies, an auxiliary superheterodyne receiver having means for the tuning thereof over said band of frequencies, the intermediate frequency of said auxiliary superheterodyne receiver being twice the intermediate frequency of said panoramic superheterodyne receiver, the frequencies of the local oscillators of the two receivers lying on the same side of a signal frequency when said two receivers are both tuned to said signal frequency, and means for electrically coupling the local oscillator of said auxiliary superheterodyne receiver to the mixer of said panoramic superheterodyne receiver.

2. A panoramic receiving system as in claim 1 in which said panoramic superheterodyne receiver includes a broad band tuned radio frequency circuit for passing said band of frequencies, a panoramic mixer electrically connected to the output of said broad band tuned radio frequency circuit, a frequency modulated local oscillator associated with said panoramic mixer, an intermediate frequency amplifier for amplifying the output of said panoramic mixer, a detector for rectifying the output of said intermediate frequency amplifier, an amplifier for amplifying the output of said detector and a cathode ray tube, said cathode ray tube having one set of plates electrically connected to the output of said amplifier and the other set of plates supplied with a voltage which is a function of the instantaneous frequency of said frequency modulated local oscillator whereby a panoramic presentation of said band of frequencies on said cathode ray tube is effected.

3. A panoramic receiving system as in claim 1 in which said auxiliary superheterodyne receiver includes a narrow band tuned radio frequency circuit having means for the tuning thereof over said band of frequencies, a mixer electrically connected to the output of said narrow band tuned radio frequency circuit, a tunable local oscillator coupled to said mixer, an intermediate frequency amplifier for amplifying the output of said mixer, a detector for rectifying the output of said intermediate frequency amplifier, an amplifier for amplifying the output of said detector and presentation means for changing the output of said amplifier to sensory information.

GORDON P. McCOUCH.

REFERENCES CITED

The following references are of record in the file of this patent:

UNITED STATES PATENTS

| Number | Name | Date |
|---|---|---|
| 2,367,907 | Wallace | Jan. 23, 1945 |
| 2,416,346 | Potter | Feb. 25, 1947 |
| 2,518,461 | Godbey | Aug. 15, 1950 |

FOREIGN PATENTS

| Number | Country | Date |
|---|---|---|
| 700,448 | Germany | Dec. 20, 1940 |

OTHER REFERENCES

Electronic Industries Article, Panoramic Principles by W. E. Moulic, July 1944, pages 86 to 88 and 106.